(12) United States Patent
Meyer et al.

(10) Patent No.: US 10,549,592 B2
(45) Date of Patent: Feb. 4, 2020

(54) BALL JOINT FOR A CHASSIS

(71) Applicant: ZF Friedrichshafen AG, Friedrichshafen (DE)

(72) Inventors: Wolfgang Meyer, Goldenstedt (DE); Ignacio Lobo Casanova, Friedrichshafen (DE); Martin Wachtel, Köln (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 253 days.

(21) Appl. No.: 15/329,267

(22) PCT Filed: Jun. 29, 2015

(86) PCT No.: PCT/EP2015/064630
§ 371 (c)(1),
(2) Date: Jan. 26, 2017

(87) PCT Pub. No.: WO2016/015934
PCT Pub. Date: Feb. 4, 2016

(65) Prior Publication Data
US 2017/0210188 A1    Jul. 27, 2017

(30) Foreign Application Priority Data
Jul. 29, 2014   (DE) .................. 10 2014 214 824

(51) Int. Cl.
*B60G 7/00*      (2006.01)
*F16C 11/06*     (2006.01)
(Continued)

(52) U.S. Cl.
CPC .......... *B60G 7/005* (2013.01); *B29C 37/0085* (2013.01); *B29C 45/14311* (2013.01);
(Continued)

(58) Field of Classification Search
CPC ................... B60G 7/005; F16C 11/0619–0695
See application file for complete search history.

(56) References Cited

U.S. PATENT DOCUMENTS 3,507,527 A * 4/1970 White ................ F16C 11/0633
                                                    384/203
5,092,703 A * 3/1992 Kobayashi .............. B29C 45/14
                                                    403/122
(Continued)

FOREIGN PATENT DOCUMENTS

DE    20 2007 001 892 U1    7/2008
DE    10 2012 218 686 A1    4/2014
(Continued)

OTHER PUBLICATIONS

German Search Report Corresponding to 10 2014 214 824.3 dated Oct. 24, 2016.
(Continued)

*Primary Examiner* — Joshua T Kennedy
(74) *Attorney, Agent, or Firm* — Davis & Bujold PLLC; Michael J. Bujold (57) ABSTRACT

A ball joint having a ball pin and a housing. The ball pin together with the ball is accommodated in the housing to move in a rotational and pivotal manner. The ball is at least partially surrounded by a structural component. The structural component is essentially formed from a fiber-plastic composite structure and at least partially forms the housing.

16 Claims, 6 Drawing Sheets

(51) Int. Cl.
  *B29C 70/40* (2006.01)
  *B29C 70/86* (2006.01)
  *B29C 37/00* (2006.01)
  *B29C 45/14* (2006.01)
  *B29K 71/00* (2006.01)
  *B29K 77/00* (2006.01)
  *B29L 31/04* (2006.01)

(52) U.S. Cl.
  CPC ........ *B29C 45/14336* (2013.01); *B29C 70/40* (2013.01); *B29C 70/865* (2013.01); *F16C 11/0657* (2013.01); *F16C 11/0685* (2013.01); *F16C 11/0695* (2013.01); *B29C 2045/14327* (2013.01); *B29K 2071/00* (2013.01); *B29K 2077/00* (2013.01); *B29L 2031/04* (2013.01); *B60G 7/001* (2013.01); *B60G 2206/7101* (2013.01); *B60G 2206/81012* (2013.01); *B60G 2206/821* (2013.01); *B60G 2206/8206* (2013.01)

(56) References Cited

U.S. PATENT DOCUMENTS

| | | | | |
|---|---|---|---|---|
| 5,427,467 A * | 6/1995 | Sugiura | ............... | F16C 11/0638 403/133 |
| 5,947,627 A * | 9/1999 | Uneme | ............. | B29C 45/14754 29/898.049 |
| 7,063,480 B2 * | 6/2006 | Ersoy | ..................... | B60G 7/005 403/122 |
| 7,322,769 B2 * | 1/2008 | Heuser | ................ | F16C 11/0638 403/133 |
| 7,938,417 B2 * | 5/2011 | Ersoy | ..................... | B60G 7/001 280/124.134 |
| 9,085,214 B2 * | 7/2015 | Nachbar | ................ | B60G 11/50 |
| 9,168,801 B2 * | 10/2015 | Dicke | ..................... | B60G 7/001 |
| 9,482,268 B2 * | 11/2016 | Nachbar | ............. | F16C 11/0623 |
| 9,616,725 B2 * | 4/2017 | Kuroda | .................. | B60G 7/001 |
| 2016/0016614 A1 | 1/2016 | Conze | | |
| 2018/0154719 A1 * | 6/2018 | Kwon | ..................... | B29C 45/14 |
| 2019/0001773 A1 * | 1/2019 | Kwon | .................. | B29C 45/14467 |
| 2019/0003523 A1 * | 1/2019 | Kuroda | .................. | F16C 11/06 |

FOREIGN PATENT DOCUMENTS

| | | |
|---|---|---|
| DE | 10 2013 200 677 A1 | 7/2014 |
| EP | 1 953 012 A2 | 8/2008 |
| WO | 2012107272 A1 | 8/2012 |
| WO | 2014/060212 A1 | 4/2014 |

OTHER PUBLICATIONS

International Search Report Corresponding to PCT/EP2015/064630 dated Sep. 24, 2015.
Written Opinion Corresponding to PCT/EP2015/064630 dated Sep. 24, 2015.

* cited by examiner

Fig. 5

BALL JOINT FOR A CHASSIS

This application is a National Stage completion of PCT/EP2015/064630 filed Jun. 29, 2015, which claims priority from German patent application serial no. 10 2014 214 824.3 filed Jul. 29, 2014.

FIELD OF THE INVENTION

The invention relates to a ball joint comprising a ball pin and a housing, wherein the ball pin together with the ball is rotationally and pivotally movably accommodated in the housing, wherein the ball is at least partially surrounded by a structural component. The invention further relates to a method for producing such a ball joint.

BACKGROUND OF THE INVENTION

EP 1 953 012 A2 shows a joint rod for use in vehicles, having a strut body, which is formed from an open section and the end of the strut body is at least partially coated by a plastic sheathing. The strut body may be formed from sheet metal, plastic or from a fiber composite material and serves to reinforce the housing, which in other respects is made of plastic, to render the desired stability in order to provide a secure hold for the ball pin in the housing. The joint rod forms a two-point link rod, which can be used in the chassis of a motor vehicle as a connecting component between the body and a further chassis component or between two chassis components. By using plastic for the housing, the weight can, compared to steel, be reduced considerably. The named patent application document shows a complete component, which does not permit the integration for the formation of a rod, which is designed without an additional reinforcing structure.

SUMMARY OF THE INVENTION

An object of the invention is solved by a ball joint, in particular for integration into a connecting rod made of fiber composite material, comprising a ball pin and a housing, the ball of the ball pin being rotationally and pivotally movably accommodated in the housing, wherein the ball is at least partially surrounded by a structural component, characterized in that the structural component is essentially formed from a fiber-plastic composite structure, in particular without a reinforcing structure, and at least partially forms the housing.

As is customary with ball joints, the ball pin has at its one end a ball, which permits the ball pin to execute rotary and pivoting movements around the center of the ball. On the side of the pivot, which faces away from the ball, there is for instance a thread, which can be used to bolt the ball pin to a connecting component, a further chassis component or the bodywork of a vehicle. A tapered seat, which seat permits a heavy-duty, form-locking connection with a connecting component or the body, is generally provided between the threaded portion and the ball.

If the ball pin, which is usually made of steel, is to be connected to a light-metal rod, to improve the connection, an intermediate, in particular conical, ring, can be provided between the ball pin and the connecting component, which makes for an improved connection between the light metal and the steel. The housing of the ball joint can also be made from steel or even from plastic, the plastic can be coated around the ball. The ball is at least partially surrounded by a structural component. The structural component is part of the housing and encompasses or surrounds it. It encompasses the ball if a hole or a receptacle or a recess is formed in the structural component. It surrounds the ball at least partially if the structural component has a spherical depression instead of the hole or the receptacle or the recess, the depression being designed in such a way that it can accommodate the ball directly or after the interposition of a bearing shell, in a rotationally and pivotally manner. Apart from the hole or the depression, the structural component is largely designed as a flat component. The planar or flat structural component can have an overall uniform wall thickness. Likewise, the structural component can have a wall thickness that is greater in the area of the connection to the ball joint than in the end region, which faces away from the ball joint. The structural component can evenly decrease over the material cross-section and diminish towards the end area remote from the housing until the material cross-section approaches zero.

The ball joint is characterized in that the structural component is essentially formed from a fiber-plastic composite structure and at least partially forms the housing. Partial housing design means that the structural component forms a, in particular essential, part of the housing. The structural component reinforces the housing and is connected to the housing in such a way that there is at least one form-locking connection between the structural component and the housing. If the plastic housing is injection-molded, a tightly bonded connection between the injection-molded plastic and the structural component is established at least in parts of the structural component at least in the area of the ball due to injection molding.

The structural component does not have a separate reinforcing structure known from the prior art, for instance in the form of back injection moldings or gate injections. This dispenses with the additional step of introducing a reinforcement. It is obvious that this results in a more favorable final product due to reduced throughput times and thus also with respect to costs. As a result of the absence of a reinforcing structure, a lower weight than for components with reinforcement is also to be expected.

The structural component is preferably produced from a preform structure, in particular TFP structure or organic sheets. Organic sheets are a semi-finished product made of thermoplastic, reinforced with continuous fibers, which is mostly produced in the form of a sheet. Organic sheets can be plastically deformed under the influence of temperature (for instance in the thermoforming process).

The term preform structure covers a blank consisting of at least one planar fabric material and being given its final shape by means of a shaping tool under the influence of pressure and temperature within the manufacturing process of the structural component. Due to the component's requirements, the strains or stresses the rod component to be produced is subject to, for instance in the chassis of a car, are determined, for instance using the finite element method (FEM). Based on the strains or stresses (with regard to intensity and direction) then known, a flat fabric is then machined to produce a preform structure having a fiber orientation that is adapted to the load. Simply stated, the fibers are compacted at the positions in the component where a higher load is to be expected. In places with lower stress, the fibers run less densely. As it is disadvantageous to interrupt fiber-plastic composite structures or their fibers (for instance by a bore which would destroy the fibers in the area of the bore), the fibers of the textile are placed such that they pass around places intended later, for example, for recesses or holes for accommodating further chassis components.

The planar fabrics can be produced in one or more layers, in particular panning out from a single layer, using processes such as the tailored fiber placement (TFP), the Jacquard process, the fiber matrix mixing process, the commingling process and/or the film stacking process. By means of these known methods almost every imaginable structure and thus also every required fiber orientation adapted to the load can be produced. The preform structure produced by these methods already indicates the shape of the future structural component. In particular, however, the fiber orientation adapted to the load indicates where the component will be subjected to a higher load during the future usage. As stated above, the structural component is to be part of the housing of the ball joint, at least one block-out or hole or recess is provided in the preform structure, into which at least the ball pin is inserted before it can be injection-molded by plastic for creating the housing. In a structural component made from a preform structure according to the above-mentioned processes (in particular TFP), the preform structure is consolidated within a shaping tool by means of supplying pressure and/or temperature, In this process step, called consolidation or consolidation process, the basic material or the fiber-plastic composite structure is strengthened by increasing the pressure and the temperature and sustaining these parameters for a certain time dependent on the parent material of the preform structure. The consolidation and the consolidation process, respectively, are also known under the term "hot pressing" or "pressing and curing". In doing so, the basic material of the preform structure is combined with a matrix material already present in or on the preform structure before it is inserted in the tool (for instance in the form of so-called hybrid yarns). Alternatively, the matrix material of the preform structure is fed into the tool, in particular in the form of a resin. Then, during consolidation a homogeneous fiber-plastic composite is formed. The feeding matrix materials in the form of resin, also called "infiltration", or in the form of hybrid yarns, will be discussed later.

Following the consolidation process, it can be cooled in the tool, with the tool closed or open and can take place within a certain period of time, depending on the material. Alternatively, controlled active cooling can also be conducted inside the tool by active cooling in the tool via a fluid, in particular a gas or a liquid. Then, the finished structural component can be removed from the shaping tool and conveyed to further processing, if applicable. The largely planar structural component produced in this way has a hole or a receptacle or a recess into which the ball pin with its ball can be inserted.

The subsequent injection molding using a plastic requires the ball pin component and the structural component to be fixed relative to one another with respect to their position and causes a housing for the ball joint to be produced, which is reinforced by the structural component.

Alternatively to a preform structure of a TFP structure or a structure according to the above-mentioned methods, organic sheets can also be used. It is possible to subject the organic sheets, in a separate, in particular preceding process step, to a deformation by thermoforming under the influence of temperature, if the structural component is to be provided with a non-planar but rather a certain shape. The above-described recess or depression for receiving the ball of the ball pin can also be produced by thermoforming. Alternatively, the organic sheets can be brought to a temperature close to the melting temperature of the matrix before being placed in a molding tool, in particular in a separate device, and inserted into the molding tool immediately after heating.

The structural component preferably has holes in a region facing away from the ball, the holes, in particular essentially, being arranged concentrically around the center of the ball. The holes in the structural component can be used as bolt-on points for the integration into a rod. In this case, a small number of, in particular three, holes can be assumed, which are designed concerning their diameter in such a way that, if bolts are used, bolts with a corresponding diameter can be used for bolting to the connecting component.

If the joint is to be formed with the structural component according to a preferred embodiment with a further fiber-plastic composite structure for the formation of a connecting rod, the holes or interruptions in the structural support of the joint cause the formation of a form-locking connection between the joint and the remaining rod part. Due to the holes or interruptions in the structural support of the joint, the latter can advantageously be connected to the remaining rod component by injection molding. The material, which is, for instance, introduced into the mounting injection molding for connecting the bearing or joint to the rod, not only encloses the structural support as a whole, but also flows into the holes or interruptions during the assembly injection molding process, thus resulting in a heavy-duty, tightly bonded connection.

The interruptions or holes are preferably designed in such a way that they have circular and/or elliptical and/or polygonal shapes. The holes or interruptions in the structural component are advantageously already introduced into the preform structure during the manufacture of the structural component from the preform structure. The holes or interruptions are produced, in particular, by drifting and/or drilling and/or by designing the fiber structures accordingly during the manufacture of the preform structure.

Preferably, the housing of the ball joint is designed in several parts, wherein at least one first part, in particular the lower housing part, is formed from the structural component, and at least one further part, in particular the upper housing part, is formed from a fiber composite material or a light metal, in particular aluminum.

In a preferred embodiment, the at least two housing parts are joined by gluing and/or by injection and/or riveting and/or injection molding, in particular by thermoplastic or thermosetting injection molding. Thermoplastic or thermosetting injection molding can be conducted during consolidation, inside the shaping tool, as already described above. This way, an articulated cartridge, which is then joined or consolidated with the structural component within the shaping tool by thermoplastic or thermosetting injection molding, can be used. An articulated cartridge is a ball-and-socket joint in itself, i.e. with a ball pin and housing and optionally a bearing shell, which at this point still has to be joined to the structural component.

Preferably, a bearing shell, in particular made of plastic, in particular mounted to the ball or inserted by means of injection, is present between the ball and the structural component and/or at least one of the housing parts. Dependent on the materials used for the plastic housing, it may be necessary to use a bearing shell to achieve the required sliding properties of the ball pin inside the housing. The bearing shell can, for instance, be preassembled with the ball pin, the ball or the bearing shell having previously been provided with a lubricant.

A bearing cage, in particular made of a metal, is preferably formed between the ball and the structural component and/or at least one of the housing parts. The bearing cage can advantageously be used to increase the extracting force if the joint has to be designed for higher extraction forces, which may act on the ball pin. Preferably, the bearing cage is connected to the structural component in a form-locking manner before injection molding with plastic for producing the housing.

In a further preferred embodiment, a thermoplastic or thermosetting plastic is injected or injection-molded between the bearing shell and/or the bearing cage and at least one of the housing parts or the structural part. This results in an overall improved modeling or encasing of the ball or the ball with the bearing shell. Furthermore, in particular, an even better connection between the upper housing part and the lower part results for a multi-part housing because these are connected to each other by means of the thermoplastic or thermosetting plastic.

The invention further relates to a method for producing such a ball joint, as described above. The ball joint is produced according to the steps listed below, the steps not necessarily having to take place as shown in the order specified here. In particular, steps listed below may be omitted.

Generally, the following steps are required:
manufacturing and provision of a structural part from a preform structure, in particular a TFP structure or an organic sheet, including the formation of a hole or a ball-cup type recess for receiving a ball pin,
provision of a ball pin,
positioning the provided components in relation to one another,
joining the provided components by gluing and/or penetrating injection and/or riveting and/or injection molding, in particular by means of a thermoplastic or thermosetting encapsulation.

At least one further housing component is preferably provided for forming a multi-part housing before positioning the components relative to one another.

Preferably, after providing the ball pin, a bearing shell is mounted thereon or a bearing shell is mounted on the ball pin before its provision. In the case of ball joints, it is known that these are produced with a certain pre-stress applied for setting a breakaway torque between the ball pin and the joint housing. For this purpose, if a bearing shell is used, it is usually necessary for the ball joint to be heated for a certain period of time after manufacture, also called annealing, to remove tension from the bearing shell material and/or let it flow to the final setting of the breakaway torque. If a structural component with a preform structure made of TFP or a similar flat fabric is used in the manufacture of the ball joint, a ball joint thus produced does not need to be annealed. During consolidation inside a tool, as described above, a relatively high temperature is applied inside the tool, and this heat causes annealing. For tempering, a temperature below the melting temperature of the bearing shell material is necessary. Therefore, a material is selected for the bearing shell, which is compatible with the consolidation process depending on the material of the preform structure. This results in considerable cost saving effects because a subsequent annealing of the ball joint can be avoided.

In another embodiment, after the provision of a ball pin, a bearing cage is provided, which may be required for the stability of the ball joint, depending on the application.

Further holes or interruptions facing away from the seat of the ball are preferably introduced during the manufacturing of the structural component from the preform structure, which in particular are produced by drifting and/or drilling and/or by designing the fiber structures accordingly during the manufacture of the preform structure.

The structural component is preferably produced from a preform structure adapted to the load or fit for the purpose, wherein, as mentioned above, the preform structure is produced as a, in particular, fabric TFP and/or using the jacquard process and/or formed from a fiber matrix mix material and/or commingling material and/or film stacking material, in particular multilayered. By means of the above-mentioned methods, a structural component can be produced in terms of shape and properties, as is also known from metal or a form formed from a fiber-plastic composite structure having a reinforcing structure.

When designing the fiber structure in the manufacture of the preform structure, the preferred load adaptation is formed by fiber orientation on the preform structure in the form of single and/or multiple hybrid yarns inserted one above the other and/or next to each other. If a hybrid yarn is used, it is a yarn in which a thermoplastic matrix is integrated. Hybrid yarns consist of a textile core thread having a thermoplastic matrix, such as Polyamide (PA), Polyetheretherketone (PEEK), Polypropylene (PP) or the like. The textile backing yarn may be twisted with the matrix material. Alternatively, the matrix material may surround the core thread, for instance by surrounding the core thread, if it runs, in particular, inside the matrix material. The thermoplastic matrix is formed similar to a wool thread where shape and composition is concerned.

The planar fabric preform structure can consist wholly or in part of these hybrid yarns, which may be provided with a reinforcing fiber of glass fiber or carbon fiber or similar known materials. Both thermoplastic TFP constructions based on polypropylene (PP), polyamide (PA), partial aromatic PA (PPA) and other thermoplastic hybrid yarns as well as dry (without matrix material) semi-finished products manufactured using the TFP process or structures, which are impregnated or infiltrated with resin by a thermoplastic RTM or T-RTM process or by thermosetting HD-RTM processes are conceivable as matrix materials for the fiber matrix system to be used.

Preferably, at least one sensor to detect a change of the fiber composite structure for indicating the load or an overload and/or overload is integrated into the fiber composite structure of the structural component or into the ball joint. The sensor is preferably connected to a detection device and/or an evaluation device. The load is preferably indicated, in particular visually and/or acoustically, to the driver in the cockpit of the vehicle, Alternatively, the evaluation unit, in particular via a vehicle bus system (for instance, CAN bus), is networked with a control device in the vehicle, to keep load values retrievably in a memory. If a load value is exceeded, the control device can influence the continuation of the journey or prevent a restart to effectively prevent driving with a faulty joint or rod or chassis.

A ball joint is preferably used in a rod of a fiber-plastic composite structure, in particular if it is made of a fabric preform structure.

The ball joint is preferably used in a steering device for an axle system, preferably for an axle system with rear wheel steering.

Further preferably, the ball joint is integrated into the rod of an adjusting device, wherein the rod can be variable in length or the rod has a displaceable tie rod, which can be adjusted in relation to the steering rod, in particular linearly, by the adjusting device.

BRIEF DESCRIPTION OF THE DRAWINGS

The invention is described below on the basis of preferred embodiments with reference to the drawings. In the drawings:

FIGS. 4a, 4a1 show views of an embodiment of the ball joint

FIGS. 4b, 4b1, 4b2 show views of a further embodiment of the ball joint

DETAILED DESCRIPTION OF THE PREFERRED EMBODIMENTS

Figure 1:
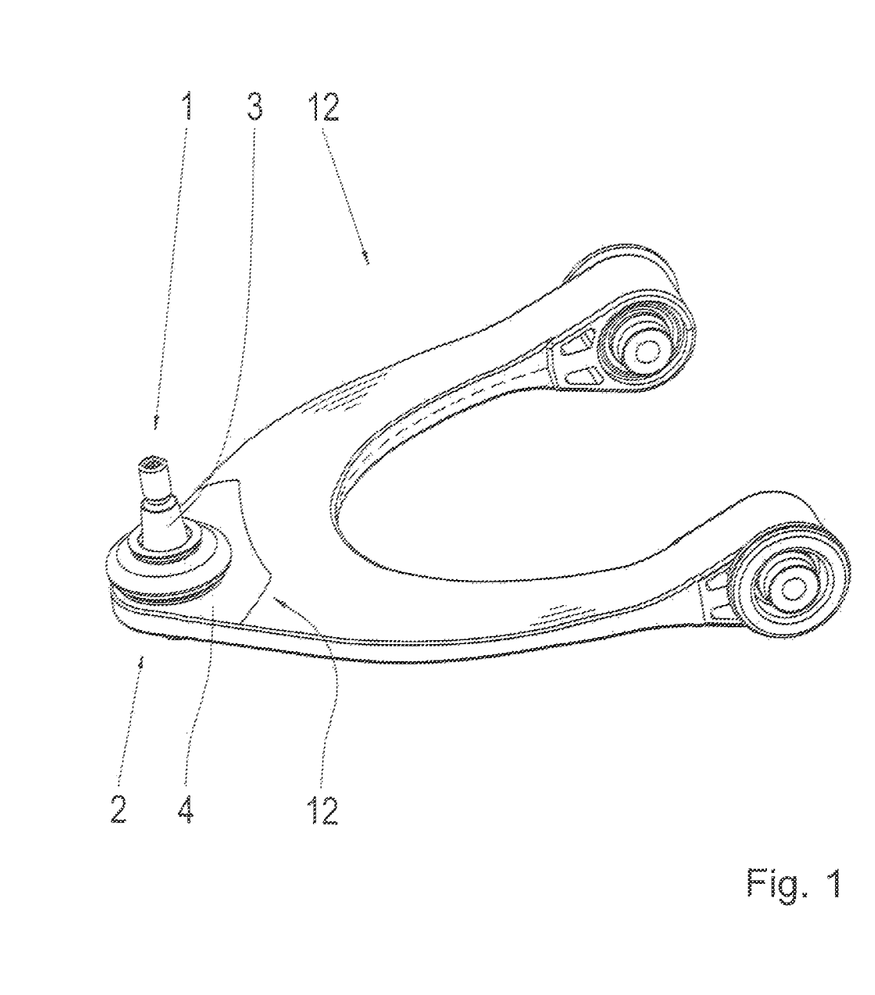
FIG. 1 shows a perspective view of a ball joint installed in a multi-point rod
Figure 1A:
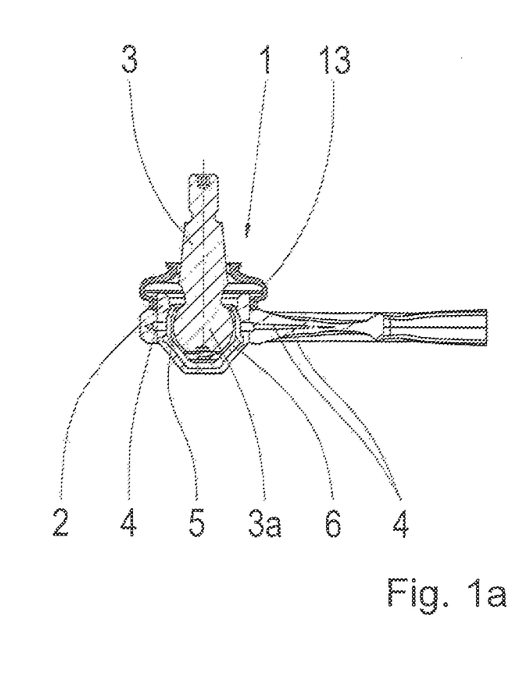
FIG. 1a shows a partial sectional view of a ball joint in accordance with FIG. 1
Figure 3:
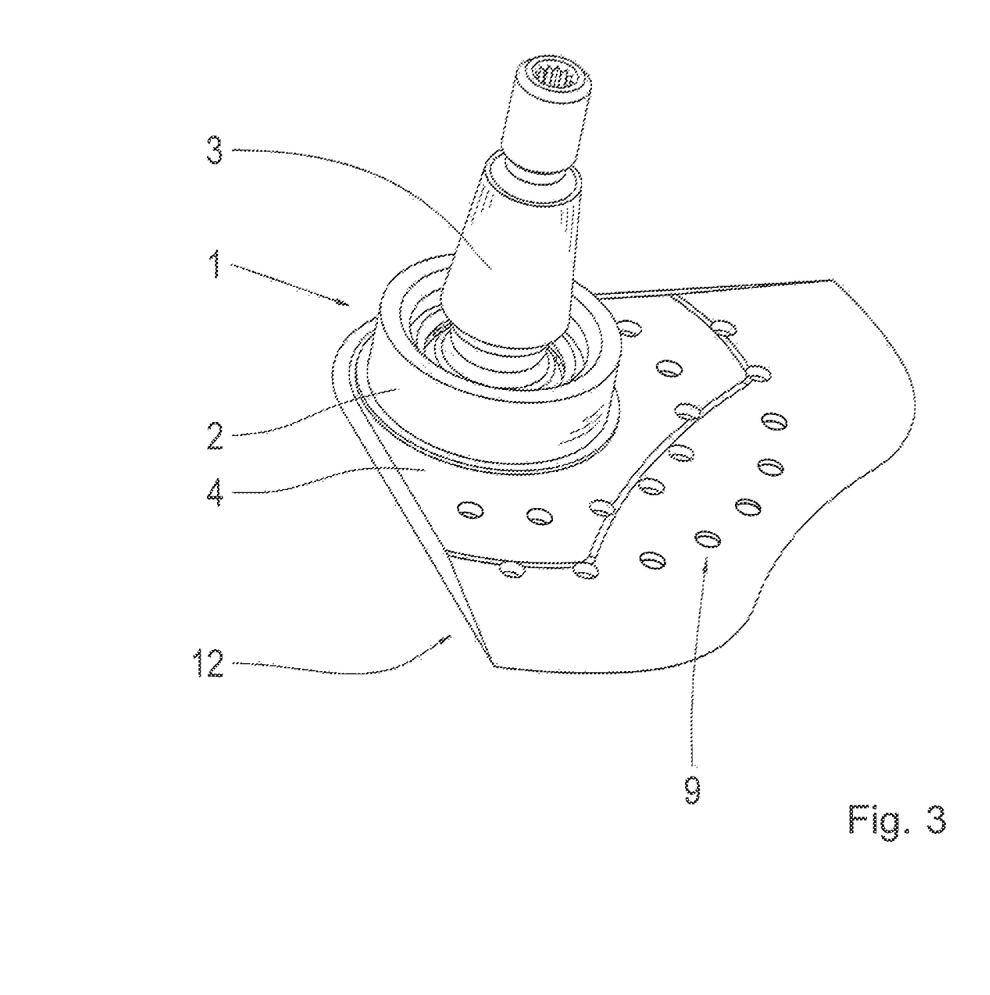
FIG. 3 a detailed view of the ball joint with a structural component

FIG. 1 shows a control arm of a motor vehicle in the form of a three-point rod, which is produced from a fiber-plastic composite structure. The control arm 1 is made from a multilayer, flat preform structure, which has been brought into its illustrated form by folding approximately around axis A shown in FIG. 1. A ball joint 1 is introduced at one end of the rod 12. As illustrated in the sectional view in FIG. 1a, the ball joint has a structural part 4, which encompasses the ball pin 3 and the bearing shell 5. The structural part 4 and the bearing shell 5 are encompassed by a housing 2. The ball joint 1 consisting of the above-mentioned components, is introduced here as a pre-assembled ball joint cartridge 1. The housing 2 can be made of plastic or is injection-molded from plastic and accommodates the ball pin 3 with the bearing shell 5 enclosing the ball. The structural part 4 encompasses the cartridge and/or the ball pin and is also held by the plastic of the injection molding. For protection against external influences and corrosion, the ball joint 1 is sealed by a bellows 13 on the side of the pivot, which encompasses the ball pin 3 and the housing 2 in a form-locking manner. The structural part 4, which is completely enclosed by the fiber-plastic composite structure, is provided for establishing the interconnection between the ball joint 1 and the rod 12. As can be seen in FIG. 3, the structural part 4 has an approximately planar form, which flattens towards the side of the end of the structural part (wedge-shaped) facing away from the ball joint 1. The structural part 4 is also penetrated by holes 9, which are arranged approximately concentrically at different radii around the longitudinal axis of the ball joint 1. The structural part 4 itself can be made of a metal material or also of a fiber-plastic composite material. Due to the fact that the structural part 4 is completely enclosed by the fiber-plastic composite structure, a homogeneous bond between the ball joint 1 and the control arm 12 itself results. The holes 9 contribute to a particularly strong bond during the consolidation process because the rod material and/or the matrix material penetrate(s) into the holes 9 during consolidation and the structural part 4 is additionally held in a form-locking manner. During manufacture, a primer or the like may be provided, depending on the material of the structural part or of the housing 2, to provide, depending on the material which is provided for the structural part, in addition to the form fit, a tightly bonded connection between the preform structure and the fiber-plastic composite structure and the structural part.

In the manufacture of a ball joint 1, consisting of at least one ball pin 3 and a housing 2 or a bearing shell 5 enclosing the ball of the ball pin 3, in principle an annealing process during the manufacture of the ball joint or downstream of the manufacture process is necessary. During annealing, the ball joint is heated for a certain period of time to permit the bearing shell material or the structure between the ball pin and the housing to settle. This is required to adjust the breakaway torque of the ball pin inside the housing. This can be dispensed with, as during the manufacture of the rod in the tool temperatures occur, which are sufficient for tempering the ball joint. This results in further possible savings, as during the manufacture of the ball joint or of the cartridge, there is no need for annealing, instead annealing can also be done in the shaping tool during the manufacture of the rod.

Figure 2:
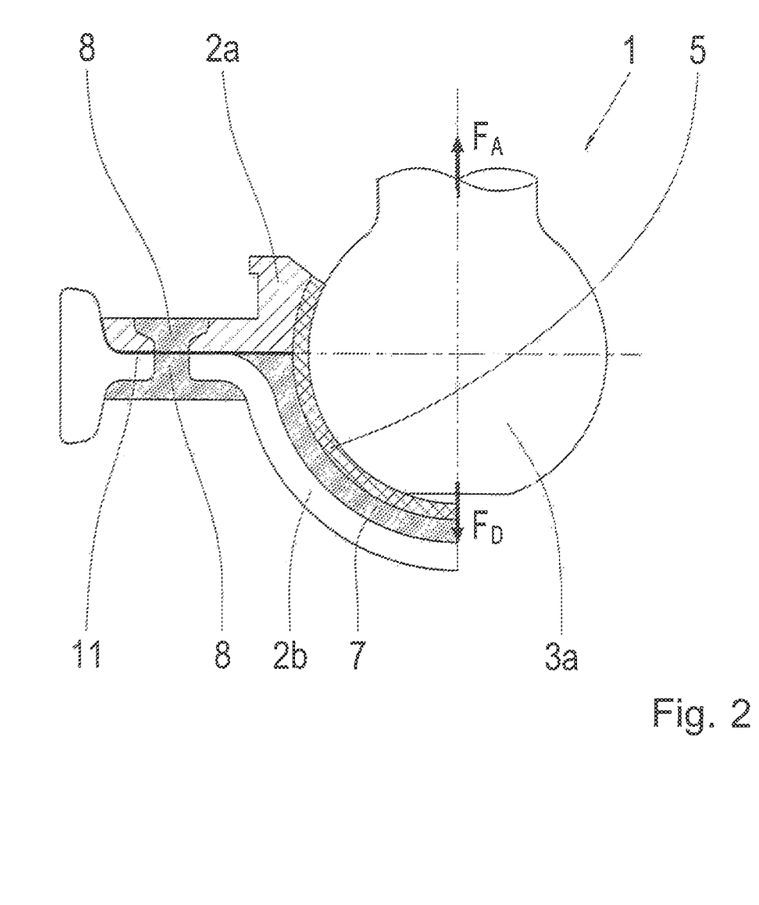
FIG. 2 shows a partial sectional view through a ball joint

FIG. 2 shows the integration of a ball joint 1 into a preformed fiber-plastic composite structure 2b. To do so, a housing made of metal, preferably an upper housing part made of aluminum 2a, has a ball pin 3 having a preassembled bearing shell 5 and the preformed fiber-plastic composite structure 2b (e.g. a preform structure made of TFP) are placed in an injection molding tool, and they are thermoplastically (T-RTM) or duroplastically (HD-RTM) injection-molded. The connection to the housing 2 can be effected both by means of an adhesive bond 11 and tightly bonded connection or form-locking engagement by means of injection molding 8 forming a rivet, or by a combination of the two options. By integrating the aluminum semi-housing into the fiber-plastic composite structure to form a multi-material design, it is ensured that high forces acting on the ball pins, such as the forces shown in FIG. 2 are $F_{A(extraction)}$ or $F_{D(compression)}$, can be realized in the case of a control arm made from a fiber-plastic structure, which would alternatively be achievable by possibly complicated, difficult-to-produce fiber orientation.

FIGS. 4a, 4a1 and 4b, 4b1 and 4b2 show further variants of ball joints, which are also suitable for integration in a fiber-plastic composite rod.

Figure 4A:
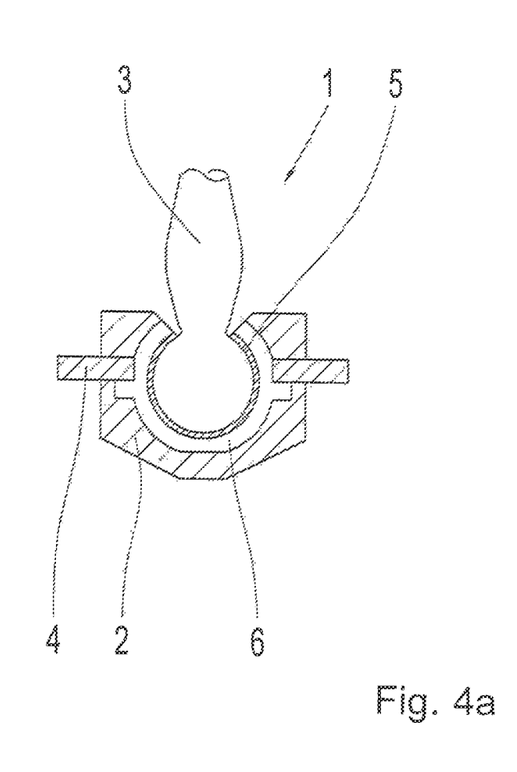
Figure 4A:
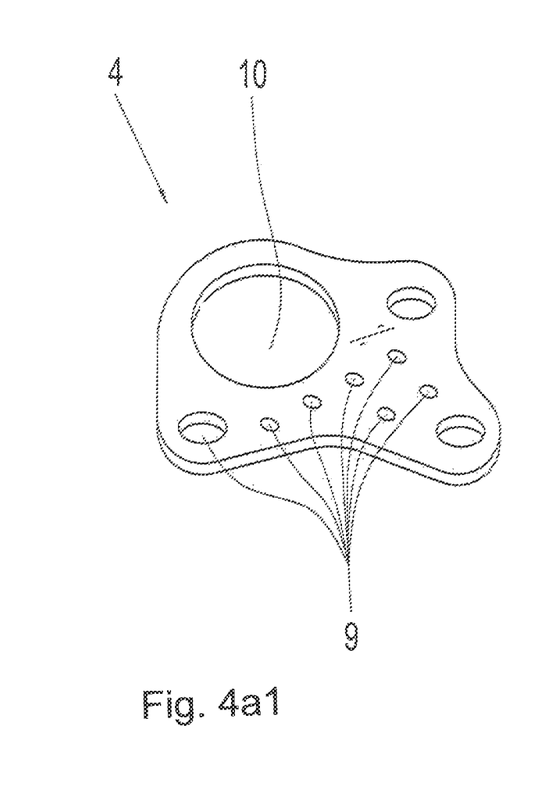

FIGS. 4a and 4a1 show a ball joint 1 having a ball pin 3 and a bearing shell 5, the ball pin 3 with enclosing bearing shell 5 being embedded in a metal housing 2 or bearing cage 6. A structural component 4, which encloses the metal housing or the bearing cage 6, is also visible. In other words, the metal housing or the bearing cage is inserted into the structural component 4 in a form-locking manner resulting in the peripheral edge resting against the hole in the structural component 4. The housing 2 encloses the aforementioned components in such a way that the ball pin 3 has the pivoting and rotational mobility typical for ball joints. The housing 2 is inserted by injection molding or encloses the structural component 4 and the bearing cage 6 into a solid composite. The structural part can be made from organic sheets or also using a preform structure produced, for instance, using the TFP method. For an embodiment made of organic sheets, this can be deep-drawn for shaping purposes.

Figure 4B:
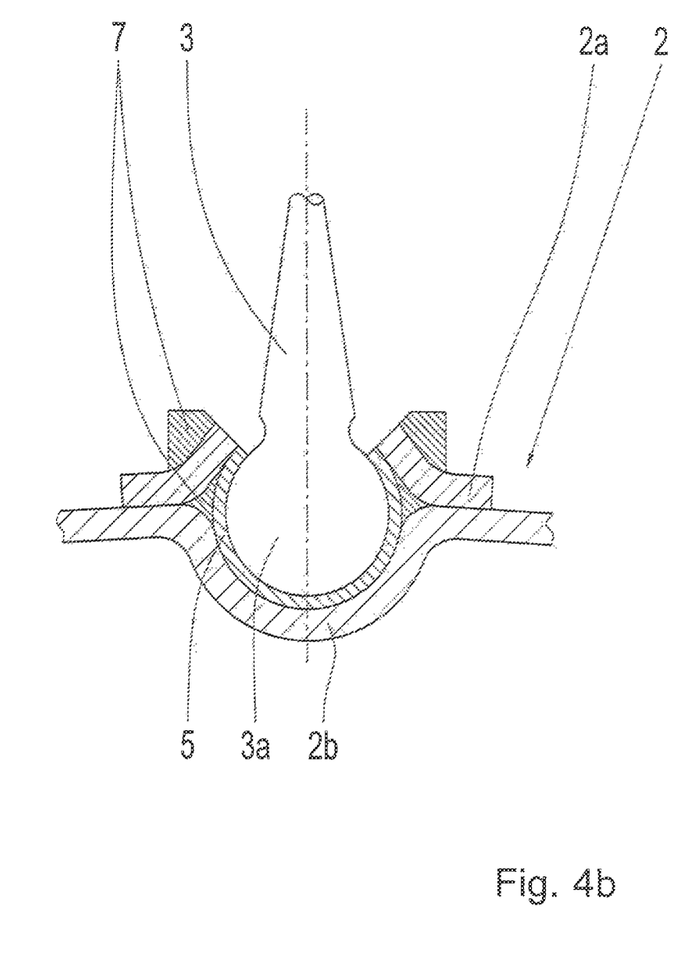

FIGS. 4b and 4b2 show a slightly modified alternative compared to FIGS. 4a and 4a1. In this case, the housing 2 is designed as a second part. The lower part 2b of the housing is designed like the structural part 4 according to FIG. 4a1, no hole being provided, but a spherical indentation or bead 14 being provided, which accommodates the bearing shell 5 or the ball 3a of the ball pin 3 at least in part, preferably half of it. The upper part 2a of the housing 2 or the part 2a of the housing 2 on the side of the pivot 2a is formed by a conical ring 2a, which is connected in a form-locking or tightly bonded manner to the lower part of the housing 2b. As a result, the ball pin 3 with the bearing shell 5 is held in the ball joint 1. As already described with reference to FIG. 2, the connection between the upper housing part 2a and the lower housing part 2b can be provided by adhesive bonding or, as also shown here, by injection molding. The conical ring can be made from deep drawn organic sheets or from a TFP structure. To produce the rod, the component preassembled in this way is inserted into the shaping tool in such a manner that the upper and lower parts of the housing are then enclosed by the fiber composite material or the structure and the injected plastic matrix in the consolidation process. Alternatively, the upper part 2a and the lower part 2b can be joined by injection molding 7 as shown in FIG. 4b.

Figure 4B:
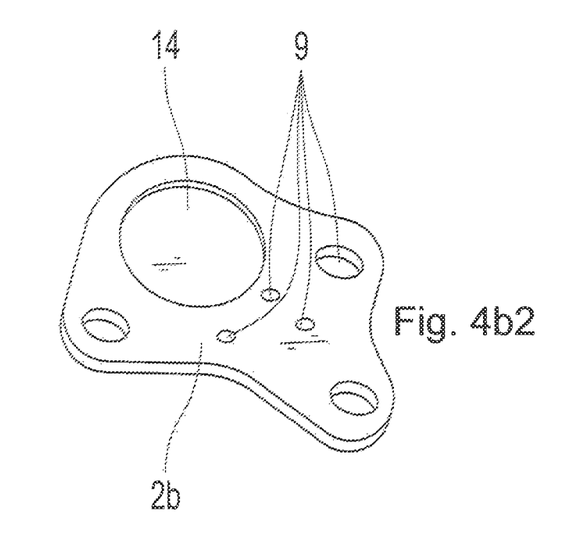
Figure 4B:
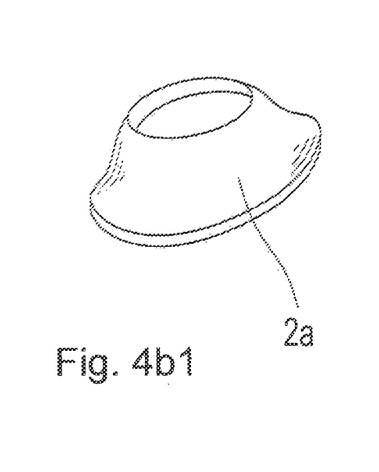

A sufficient strength of the ball joint with regard to the compressive forces ($F_D$) or tensile forces ($F_A$) acting through the ball pin to prevent the ball pin from being extracted by these forces is thus obtained.

Figure 5:
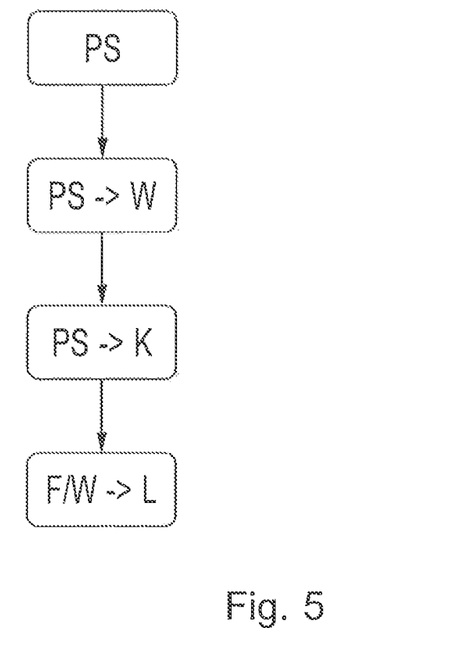
FIG. 5 shows a sequence of the process steps according to the invention

FIG. 5 shows a sequence of the process steps according to the invention. In a first step PS, a preform structure is manufactured, e.g. a flat fabric semi-finished product, which is produced by means of the TFP method using hybrid yarns sewn onto the flat fabric. In a further step PS-<W, the workpiece is introduced into a shaping tool by means of a handling robot. In this step, a ball bearing having a bearing shell mounted thereon is also inserted and positioned into the tool. Then the tool is closed. In a subsequent step, the component is consolidated. A plastic is injected to form the housing. Likewise, a matrix material in the form of a resin is injected into the tool surrounding the knitted fabric. In doing so, a temperature adapted to the materials used and a predetermined pressure are generated in and/or using the tool and maintained for a specific time. The housing and the composite of housing with structural component are produced in this way. Then the ball joint is finished and can be removed from the tool, which again is done by means of a handling robot (step F/W-<K), It goes without saying that the above-mentioned features of the invention cannot only be used in the respective combination indicated, but also in other combinations or stand-alone, without leaving the scope of the invention. It is likewise within the scope of the invention to effect a mechanical reversal of the functions of the individual mechanical elements of the invention.

REFERENCE NUMERALS 1 ball joint, cartridge
2 housing
2a upper housing part
2b lower housing part
3 ball pin
3a ball
4 structural component
5 bearing shell
6 bearing cage
7 plastic, injection molding
8 rivet connection, injection molding
9 hole, receptacle, recess
10 hole
11 bond
12 control arm
13 bellows
14 bead
$F_A$ extracting force
$F_D$ compressive force

The invention claimed is:

1. A ball joint comprising:
a ball pin defining an axis,
a housing defining an axis, the ball pin and the housing, when coaxially aligned, define a longitudinal axis of the ball joint,
the ball pin together with a ball being accommodated within a hole in the housing such that the ball pin and the ball are rotatable and pivotable in the housing relative to the longitudinal axis of the ball joint,
the ball being at least partially surrounded by a structural component,
the structural component being formed primarily from a fiber-plastic composite structure and at least partially forming the housing of the ball joint, and the structural component only extending from the housing in a plane that is perpendicular to the longitudinal axis of the ball joint, and
the structural component having a plurality of further holes extending therethrough.

2. The ball joint according to claim 1, wherein the structural component is produced from a preform structure.

3. The ball joint according to claim 1, wherein the further holes being located in a region of the structural component radially spaced from the ball, and the further holes are arranged in a circular arc pattern that is concentric with a center of the ball.

4. The ball joint according to claim 3, wherein the further holes have at least one of a circular shape and an elliptical shape.

5. The ball joint according to claim 1, wherein the housing is designed as at least first and second housing parts, at least the first housing part, being a lower housing part, is formed from the structural component, and at least the second housing part, being an upper housing part, is formed from either a fiber composite material or a light metal.

6. The ball joint according to claim 5, wherein the at least the first and the second housing parts are joined by at least one of gluing, injection, riveting, thermoplastic injection molding and thermosetting injection molding.

7. The ball joint according to claim 5, wherein a bearing shell made of plastic, either mounted to the ball or inserted by injection, is present between the ball and the structural component and at least one of the first and the second housing parts.

8. The ball joint according to claim 7, wherein either a thermoplastic or a thermosetting plastic is injected between at least one of a bearing shell and a bearing cage and either at least one of the first and the second housing parts or the structural part.

9. The ball joint according to claim 5, wherein a bearing cage made of a metal is formed between the ball and the structural component and at least one of the first and the second housing parts.

10. The ball joint according to claim 1, wherein the plurality of further holes being arranged in the planar region of the structural component in a circular arc pattern that is concentric with a center of the ball.

11. A process of manufacturing a ball joint having a ball pin and a housing, the ball pin together with a ball being rotationally and pivotally movably accommodated in the housing, and the ball being at least partially surrounded by a structural component and the structural component is formed primarily from a fiber-plastic composite structure and at least partially forming the housing, the method comprising the steps of:
manufacturing and providing the structural component from a preform structure including forming either a hole or a ball-cup type recess for receiving the ball pin;
introducing either further holes or interruptions into the structural component that extend therethrough and are arranged in a circular arc pattern that is concentric with a center of the hole or the ball-cup type recess for receiving the ball pin;

providing the ball pin;

positioning the provided structural components; and joining the provided structural components by at least one of gluing, penetrating injection, riveting, and injection molding by thermoplastic encapsulation or thermosetting encapsulation.

12. The process according to claim 11, further comprising providing at least one further housing part before positioning of the structural components for forming a multipart housing.

13. The process according to claim 11, further comprising either mounting a bearing shell on the ball pin after providing the ball pin or mounting a bearing shell on the ball pin before providing the ball pin.

14. The process according to claim 11, further comprising providing a bearing cage after providing the ball pin.

15. The process according to claim 11, further comprising introducing either the further holes or the interruptions, facing away from a seat of the ball, during the manufacture of the structural component from a preform structure, and the further holes or the interruptions being produced by at least one of drifting, drilling, by designing fiber structures accordingly during manufacture of the preform structure.

16. The process according to claim 11, further comprising integrating the ball joint in a chassis rod made from a fiber-plastic composite preform structure.

* * * * *